US 8,082,939 B2

(12) United States Patent
Sears et al.

(10) Patent No.: US 8,082,939 B2
(45) Date of Patent: Dec. 27, 2011

(54) SEAL LEAKAGE GAS RECOVERY SYSTEM

(75) Inventors: John Sears, Calgary (CA); Shawn Patterson, Calgary (CA)

(73) Assignee: Flowserve Management Company, Irving, TX (US)

( * ) Notice: Subject to any disclaimer, the term of this patent is extended or adjusted under 35 U.S.C. 154(b) by 2 days.

(21) Appl. No.: 12/804,607

(22) Filed: Jul. 26, 2010

(65) Prior Publication Data

US 2010/0294374 A1    Nov. 25, 2010

Related U.S. Application Data

(63) Continuation of application No. PCT/US2009/06578, filed on Dec. 15, 2009.

(60) Provisional application No. 61/201,777, filed on Dec. 15, 2008.

(51) Int. Cl.
*G05D 7/00* (2006.01)
(52) U.S. Cl. .......... 137/1; 137/312; 415/112; 415/168.2
(58) Field of Classification Search .................. 137/312, 137/1, 15.11; 415/112, 168.2, 230
See application file for complete search history.

(56) References Cited

U.S. PATENT DOCUMENTS

| | | | |
|---|---|---|---|
| 3,645,643 A * | 2/1972 | King et al. ............. | 415/111 |
| 3,909,012 A | 9/1975 | Denis | |
| 4,193,603 A | 3/1980 | Sood | |
| 4,432,442 A | 2/1984 | Vogelsang | |
| 4,477,223 A | 10/1984 | Giroux | |
| 4,621,981 A | 11/1986 | Lorett | |
| 4,993,917 A | 2/1991 | Kulle et al. | |
| 5,412,977 A | 5/1995 | Schmohl et al. | |
| 5,632,492 A | 5/1997 | Lehmann et al. | |
| 5,765,998 A | 6/1998 | Zacharias et al. | |
| 6,345,954 B1 | 2/2002 | Al-Himyary et al. | |
| 6,394,764 B1 | 5/2002 | Samurin | |
| 6,454,523 B1 | 9/2002 | Loyd et al. | |
| 6,582,185 B2 | 6/2003 | Lippert et al. | |
| 7,500,490 B2 * | 3/2009 | Wagner ................. | 137/312 |
| 7,665,480 B2 * | 2/2010 | Angelosanto et al. ........ | 137/312 |
| 2001/0017445 A1 | 8/2001 | Hall et al. | |

FOREIGN PATENT DOCUMENTS

JP    61/038104    2/1986

OTHER PUBLICATIONS

The International Search Report and Written Opinion of the International Searching Authority for PCT/US2009/006578, date completed Apr. 19, 2011, date mailed Apr. 29, 2011.

* cited by examiner

*Primary Examiner* — Kevin Lee
(74) *Attorney, Agent, or Firm* — Miller, Canfield, Paddock and Stone; Mark L. Maki

(57) ABSTRACT

A dry gas seal leakage recovery system is provided which collects seal leakage gas from one or more mechanical seal assemblies, pressurizing and controlling the outlet distribution pressure of the collected seal leakage, and re-injecting the gas back into the compressor or seal supply system.

18 Claims, 8 Drawing Sheets

SEAL LEAKAGE GAS RECOVERY SYSTEM

CROSS-REFERENCE TO RELATED APPLICATIONS

This application is a continuation of International Application No. PCT/U.S.2009/006578, with an international filing date of Dec. 15, 2009, which claims the benefit of U.S. Provisional Patent Application No. 61/201,777, filed Dec. 15, 2008, which is hereby incorporated by reference in its entirety.

FIELD OF THE INVENTION

The invention relates to a recovery system for dry gas seals and more particularly, to assist in recovering sealed leakage gas from a mechanical seal assembly used for sealing a rotating shaft of rotating equipment such as compressors.

BACKGROUND OF THE INVENTION

Rotating equipment such as compressors include a motor-driven shaft that drives a rotatable component such as an impeller for pumping a fluid such as a gas or other type of processed fluid. Such mechanical seals typically include opposed pairs of relatively rotatable seal rings which are supported in a seal housing and are mounted in surrounding relation to the equipment shaft. One seal ring remains stationary while the other seal ring is fixedly mounted on the shaft so as to rotate therein wherein the seal rings are relatively rotatable and have opposed interfacing seal faces which define a sealing region that prevent or greatly minimizes the leakage of process fluid across the sealing region.

Mechanical seals can be provided in various combinations including double and tandem configurations. In dry gas mechanical seals of this type, a buffer fluid can be provided outboard of the seal rings, and additionally a seal supply gas can be supplied to the region adjacent the seal faces. During shaft rotation, a thin fluid film forms between the seal faces to separate the seal faces and provide dry gas, non-contacting operation of the mechanical seal.

In various mechanical seal configurations, the separation of the seal faces may allow for a process fluid located adjacent the seal rings to leak past the seal interface. However, discharge of such process fluid into the atmosphere is highly undesirable, and therefore, the invention relates to a recovery system for recovering any leakage across the seal rings to thereby prevent seal leakage from leaking to the ambient environment.

In particular, the invention relates to a leakage recovery system which collects any seal leakage gas from one or more dry gas seals in a recovery system, pressurizes such seal leakage, and returns the seal leakage to the compressor system at a point in the compressor system wherein the seal leakage can be used as a supply gas provided adjacent the inboard process side of the mechanical seal rings or alternatively, provided to the suction side of the compressor.

Other objects and purposes of the invention, and variations thereof, will be apparent upon reading the following specification and inspecting the accompanying drawings.

Figure 1:
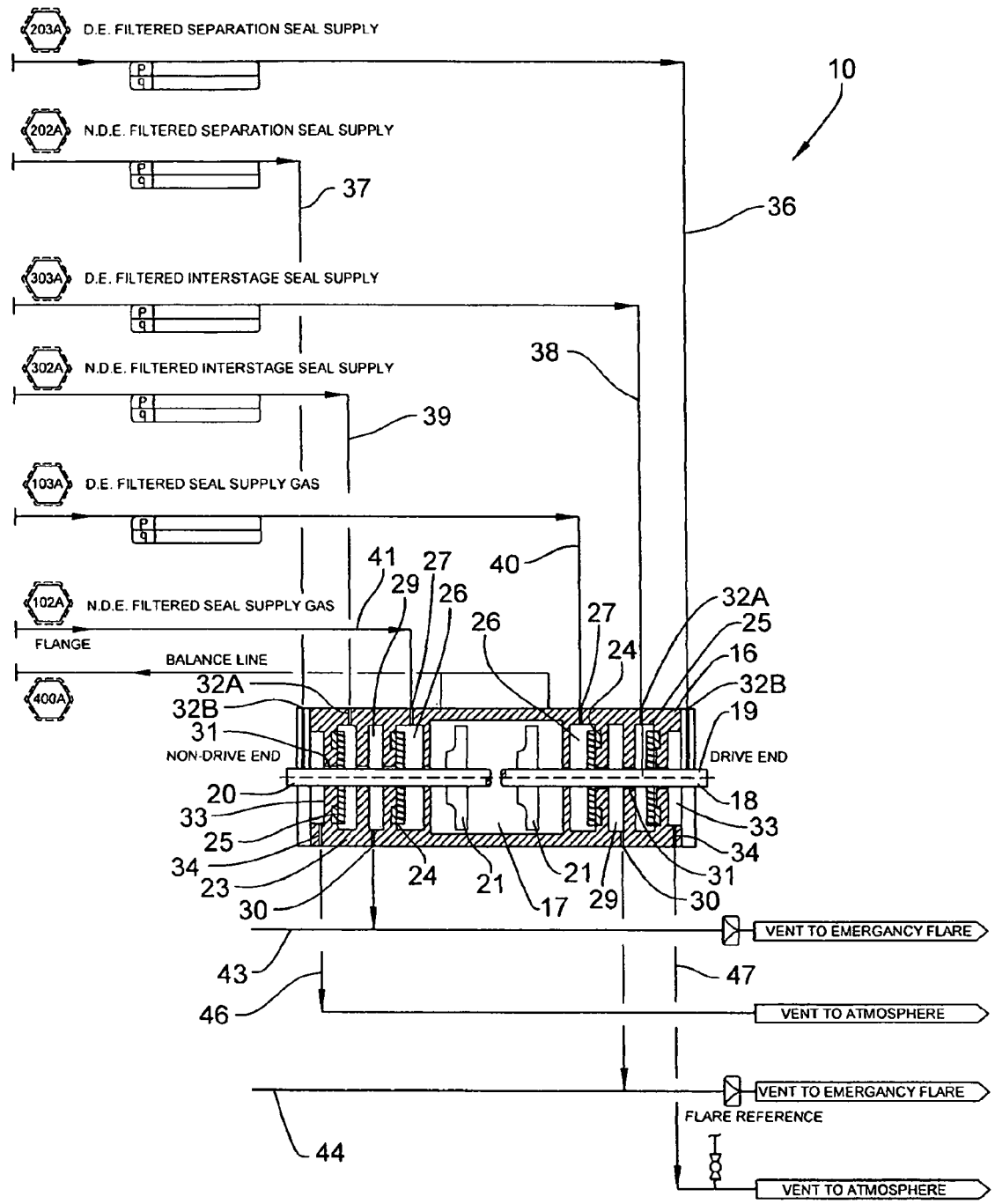
FIG. 1 is a diagram of a compressor system.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
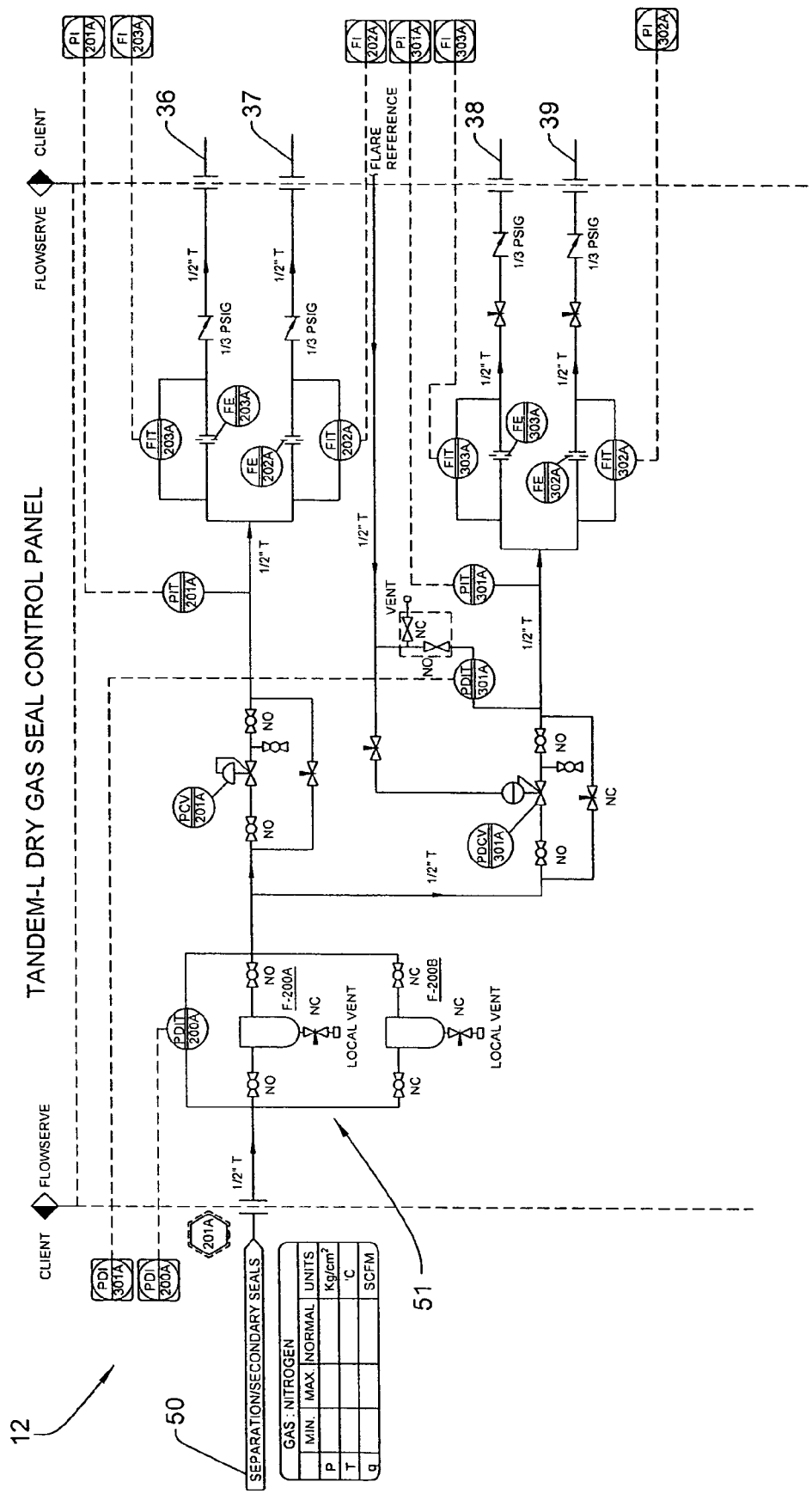
FIGS. 2-2B are a first diagram of the control panel for the compressor system.
Figure 2A:
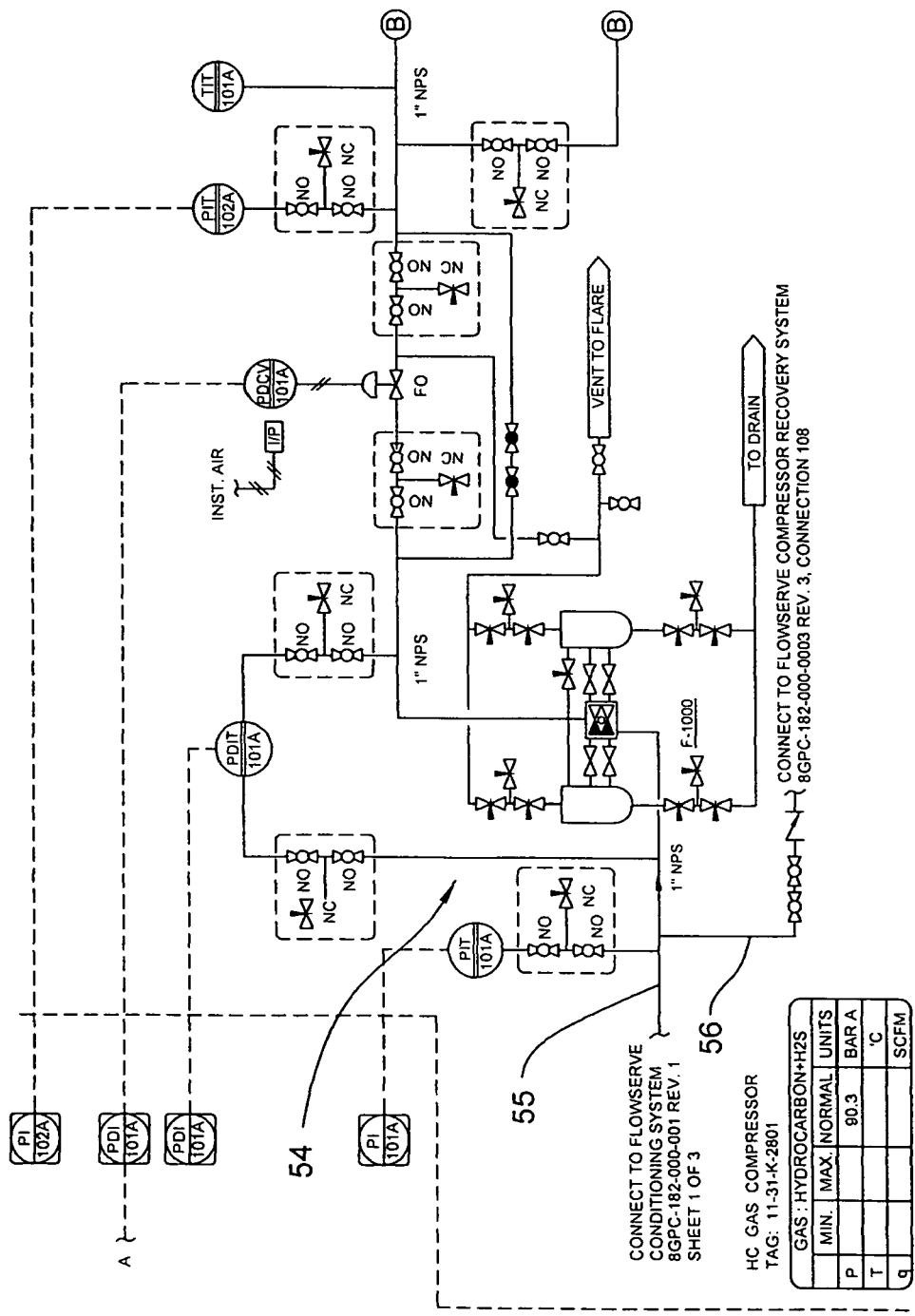
Figure 2B:
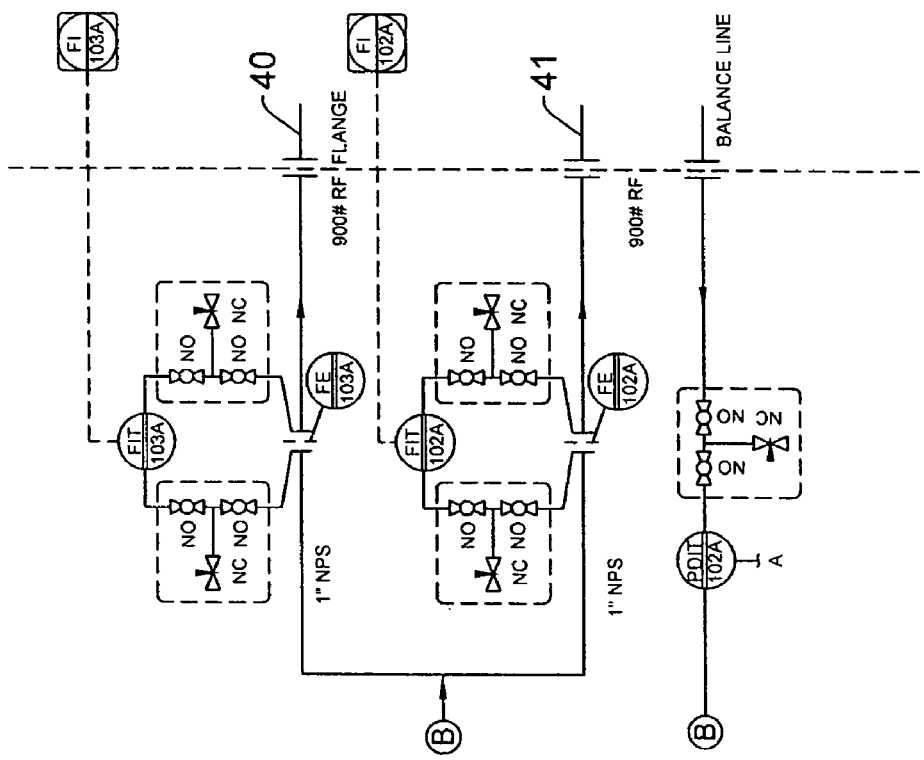
Figure 3:
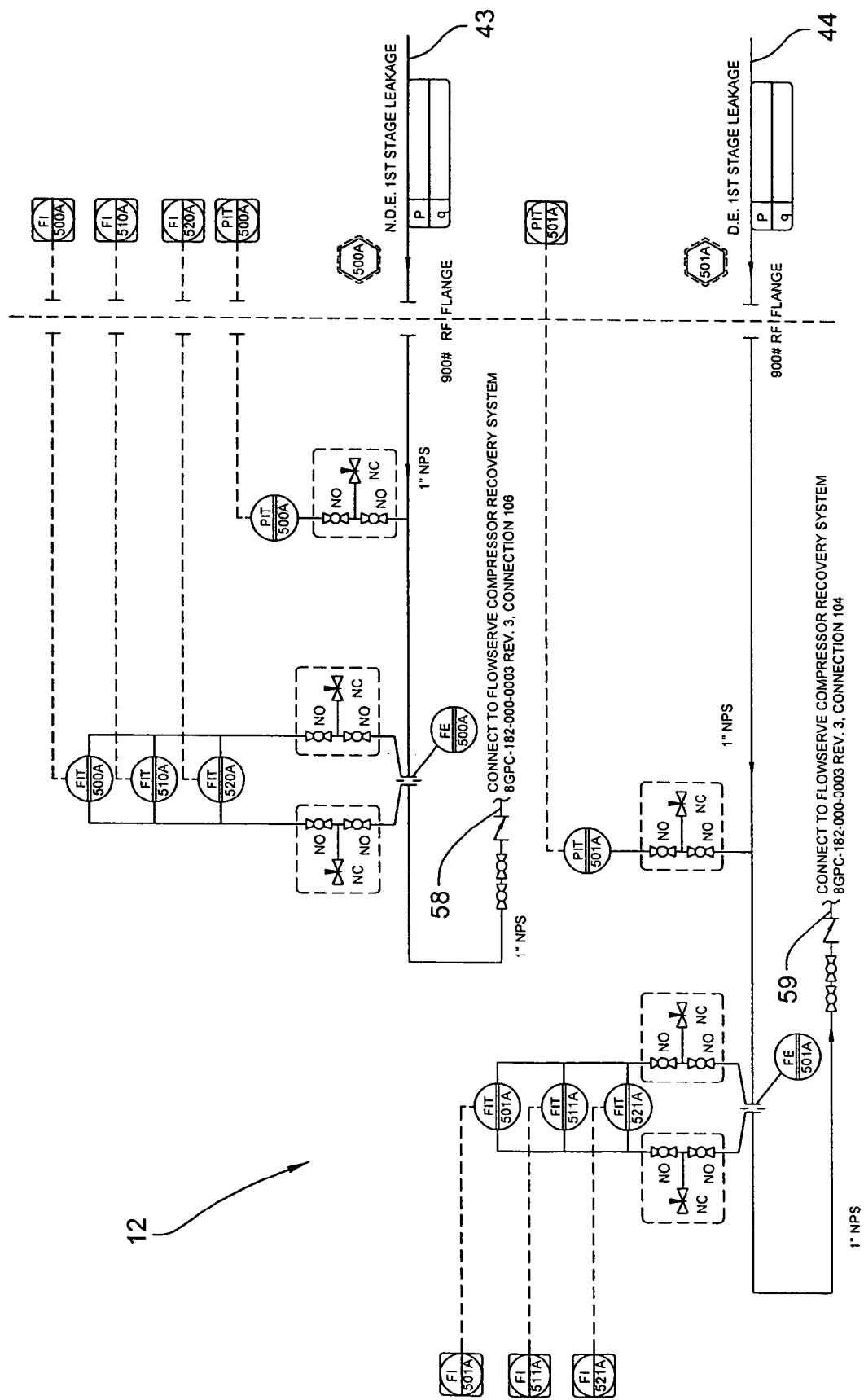
FIG. 3 is an additional diagram of the control panel of FIG. 2.
Figure 4:
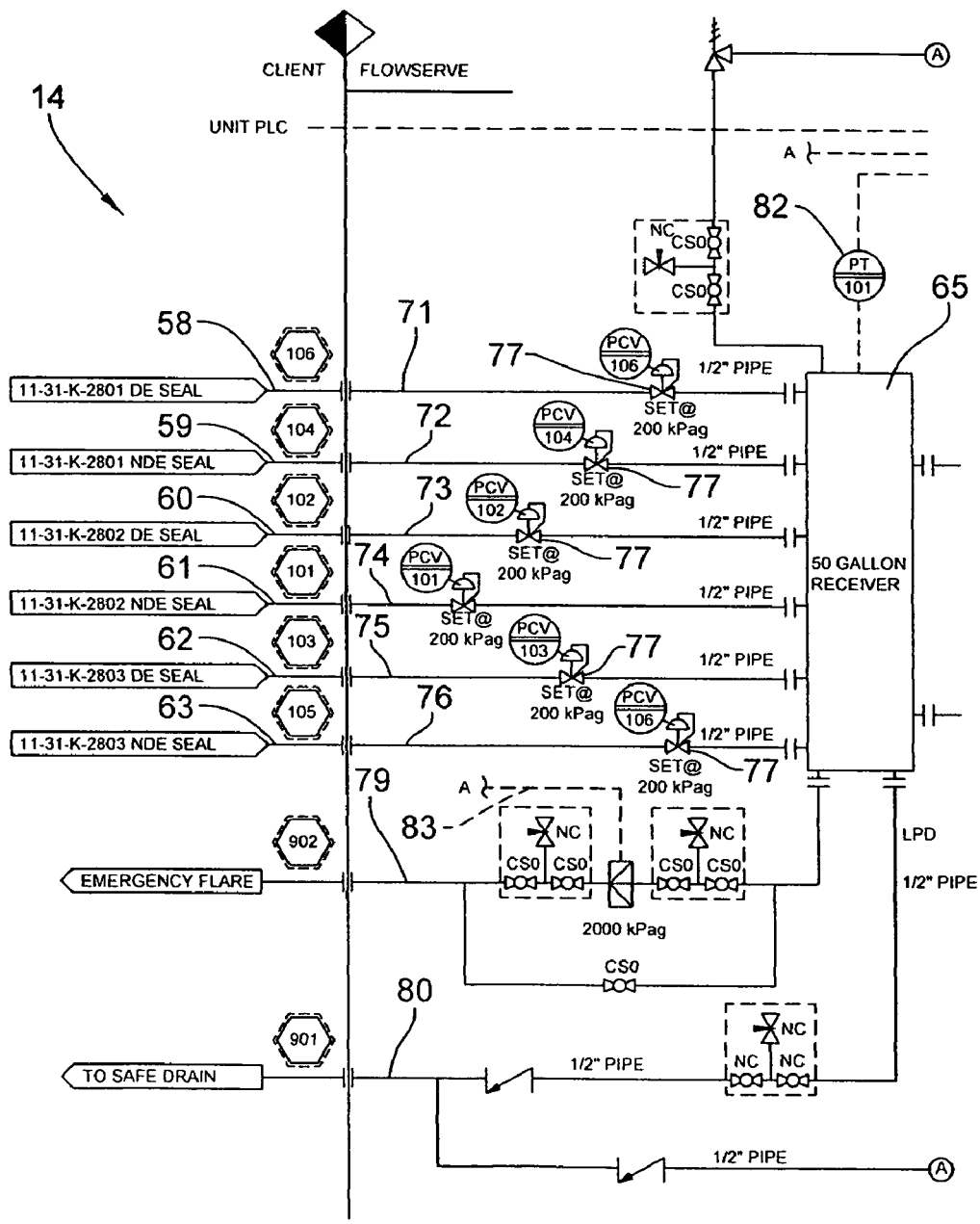
FIGS. 4-4A are a first diagram of a compressor recovery system for the compressor system.
Figure 4A:
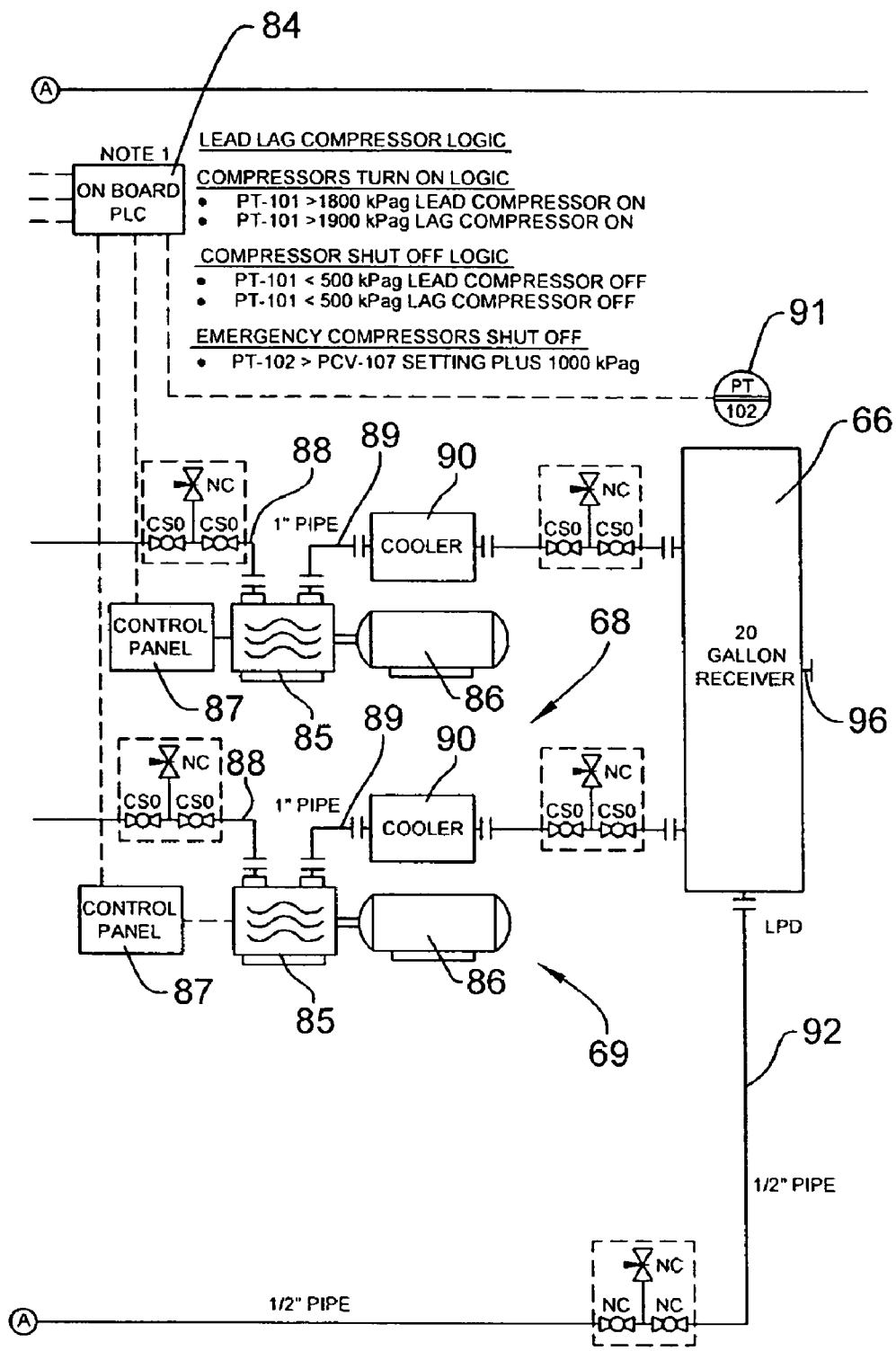
Figures 5, 6:
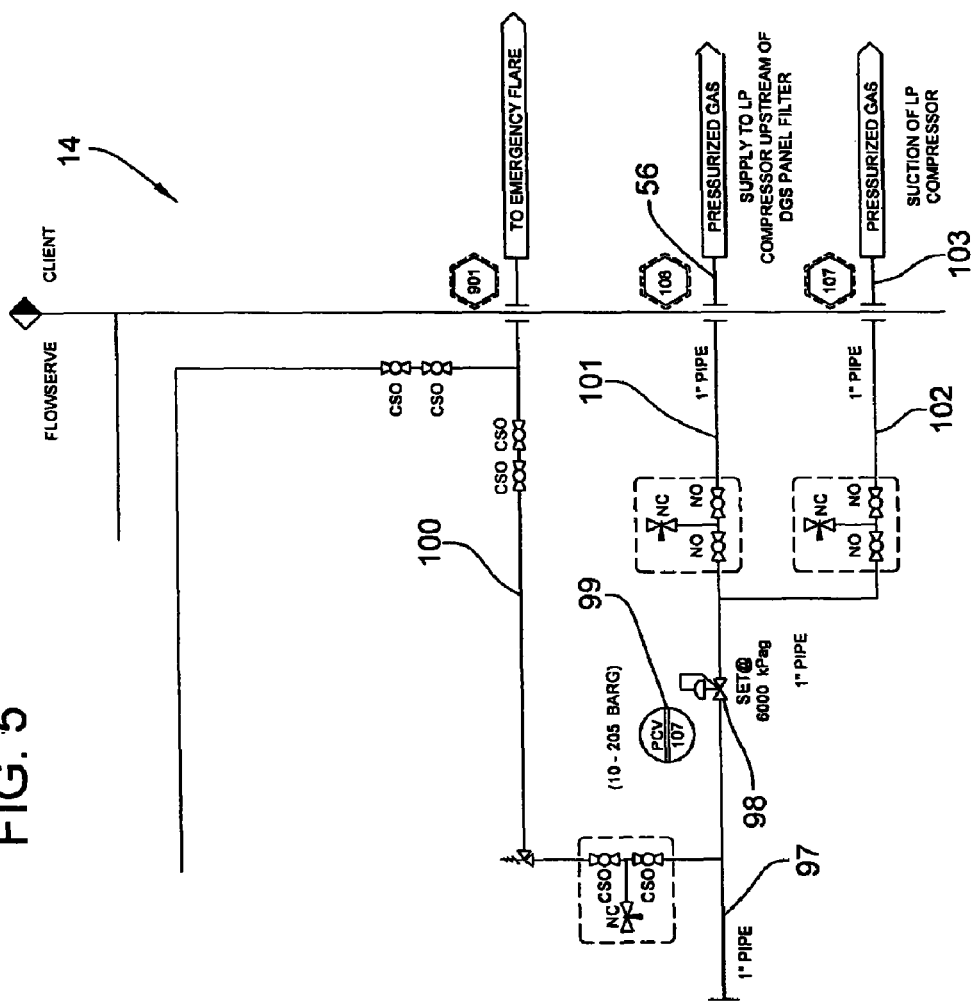
FIG. 5 is a second diagram of the recovery system of FIG. 4.
FIG. 6 is a legend showing the symbols used in the foregoing diagrams.

Referring to FIG. 1, a compressor system 10 is illustrated which is configured for connection to a dry gas seal control panel 12 illustrated in FIGS. 2 and 3, and a dry gas seal leakage recovery system 14 illustrated in FIGS. 4 and 5. While the diagrams of FIGS. 1-5 illustrate in detail the sensors, valves and piping of such systems, the invention relates more generally to the interconnection of these components for recovering dry gas seal leakage and re-injecting same into the compressor system 10. FIG. 6 is included as a legend for the various symbols used in the diagrams of FIGS. 1-5.

Referring to FIG. 1, the compressor system 10 is illustrated as an exemplary embodiment for use with the recovery system 14, although it will be understood that the recovery system 14 is suitable for use with other compressor and pumping systems and with a variety of mechanical seals and mechanical seal configurations.

The compressor system 10 comprises a compressor 16 having a process fluid chamber 17 through which extends a rotatable drive shaft 18 having a drive end 19 that is driven by a motor, and a non-drive end 20. The shaft 18 mounts thereon impellers 21 which rotate in unison with shaft 18 to pressurize and displace the process fluid such as a process gas that is received in the process fluid chamber 17 through a compressor inlet and discharged therefrom through a compressor outlet. The construction of the compressor 16 is generally conventional such that specific illustration of the inlet and outlet is not required. It will be understood that the recovery system 14 is not limited or restricted to use with compressors and is readily adaptable to a variety of equipment having mechanical seals therein.

The compressor unit 16 further comprises a housing 23 wherein the opposite drive and non-drive ends of the housing 23 each mount therein a pair of mechanical seal assemblies 24 and 25. In particular, these mechanical seals 24 and 25 respectively define inboard and outboard seals 24 and 25.

On the inboard process fluid side of the mechanical seal 24, a seal supply chamber 26 is defined having a supply gas inlet 27 through which a supply gas will be supplied as described further hereinafter. Between each respective pair of seals 24 and 25, a buffer fluid chamber 29 is defined that is formed in inboard and outboard sections which are separated by a divider wall but are still in communication with each other by a flow-restricting labyrinth 31.

It is noted that the buffer fluid chamber 29 further includes an inlet 32A through which a buffer fluid is injected or supplied as will be described further below. The inboard section of the buffer fluid chamber 29 includes an outlet port 30 to allow for egress or discharge of dry gas seal leakage which may leak into such chamber section.

On the outboard end of the housing 23, a separation seal supply inlet 32B is provided which also supplies an inert gas to the shaft surface to further separate the outboard seals 25 from atmosphere. An outboard chamber 33 is defined at this end which includes an outlet 34.

The compressor unit 16 is connected to various gas supply lines and discharge lines as will be described further.

As to the gas supply, the illustrated embodiment preferably is provided with a buffer fluid defined by a nitrogen gas, although it will be understood that other fluids, preferably gases, may be provided. In particular, the buffer fluid gas is first provided through separation seal supply lines 36 and 37 which respectively connect to the inlets 32B at the drive end (DE) and non-drive end (NDE). These lines 36 and 37 supply the nitrogen gas at the outboard end of the compressor unit 16.

Further, the nitrogen gas also is supplied as an interstage seal supply which flows through supply lines 38 and 39. The supply lines 38 and 39 connect to the buffer fluid inlets 32A and supply the nitrogen gas to the barrier fluid chambers 29 which fluid is able to flow from the outboard chamber sections through the intermediate labyrinths 31 to the inboard chamber sections 29. As such, any barrier fluid reaching this inboard chamber section may then discharge or flow therefrom through the outlet 30.

Also, a supply gas is fed to the supply gas chambers 26 through the inlets 27. This supply gas preferably differs from the buffer fluid in the illustrated embodiment, since it is fed with process fluid collected from the compressor unit 16 or its associated piping, for example, from the discharge side of the compressor or even at an intermediate location in the compressor system. This pressurized supply gas preferably is provided at a pressure which is slightly higher than the process fluid pressure generated in the process fluid chamber 17. Due to the inherent operation of the inboard mechanical seals 24 which results in slight separation of the seal faces, the supply gas provided through the supply lines 40 and 41 and the respective inlets 27 may leak past the inboard mechanical seals 24 into the inboard chamber section of the buffer fluid chamber 29. Any such dry gas seal leakage, however, is able to exit therefrom through the outlet ports 30 for subsequent collection by the recovery system 14 described below.

It is understood that the compressor unit 16 in the illustrated embodiment is a tandem-L mechanical seal configuration and that other seal configurations may be provided for use with the recovery system 14 of the invention.

In the illustrated compressor unit 16, the buffer fluid may flow to the outlet 30, wherein a substantial portion of the buffer fluid that is provided to the buffer fluid chamber 29 is able to flow to this outlet 30. Additionally, leakage may occur through the mechanical seals 24, which leakage may be process fluid itself or the supply gas as provided through the supply lines 40 and 41. As such, the gas exiting through the outlet 30 typically contains a certain level of such process fluid and supply gas in combination with buffer fluid. In some seal configurations, a substantial portion of the fluid exiting the outlets 30 will be such process fluid or supply gas. As such, the discharged leakage cannot be directly vented to atmosphere since such would be a contaminant. Therefore, the leakage fluid exiting through the ports 30 flows downstream through the discharge lines 43 and 44, which lines may also be configured for venting to emergency flare.

Additionally, the outlets 34 may contain an inert separation seal gas therein and are not contaminated, such that the outlets 34 can be connected to discharge lines 46 and 47 and vented to atmosphere.

As to FIG. 2, FIG. 2 illustrates the piping system for supplying the barrier fluid gas, i.e. nitrogen gas, to the supply lines 36, 37, 38 and 39. This gas is provided from a source 50 wherein the gas is piped through various monitoring and control components including a filter 51.

Further, the supply gas is provided to the supply lines 40 and 41 through the supply gas system 52, which system includes a dry gas seal filter 54. This filter 54 removes debris and/or moisture from the gas being supplied thereto. The supply gas is provided through inlet line 55 which receives compressor gas from the compressor unit 16. Additionally, a second inlet line 56 is provided upstream of the filter 54, which inlet line 56 receives recovered gas from the recovery system 14 described below for re-injection into the compressor system.

Referring to FIG. 3, the non-drive end leakage exits the compressor unit 16 and flows through the discharge line 43, while the drive end leakage flows through the line 44. The collected leakage flows through the lines 43 and 44 and is then provided to the control panel 12. As this leakage flows through control panel lines 58 and 59 seen in FIG. 3, such lines 58 and 59 in turn are configured for connection to the recovery system 14 illustrated in FIGS. 4 and 5.

Turning to FIG. 4, these leakage lines 58 and 59 form two inlet sources for the recovery system 14. It is noted that the recovery system 14 also may connect to additional leakage lines 60-63 which correspond to four additional seals, for example, provided on the drive end (DE) or non-drive end (NDE) of additional compressors. Hence, the recovery system 14 may connect to one to six dry gas seals through one to six leakage lines 58-63, although any number of additional leakage lines may be accommodated by suitable sizing of the system components.

Referring more particularly to the recovery system 14, such recovery system includes a first accumulator or receiver 65 and a second accumulator or receiver 66 located downstream therefrom. Between the receiver 65 and 66, a pair of compressor units 68 and 69 are provided to pump and pressurize the leakage collected in the receiver or accumulator 65 and pass such fluid to the receiver or accumulator 66.

More particularly, the leakage lines 58-63 connect to respective leakage inlet lines 71-76 which pass through respective control valves 77. The valves 77 are preferably set at 200 kPag wherein the seal leakage then flows downstream from such valves 77 to the collection accumulator or receiver 65. The receiver 65 is sized to have a suitable volume capacity depending upon the number of leakage lines and flow rate being received therein. Further, this 50-gallon receiver includes an emergency flare system 79 connected thereto as well as a liquid drain system 80.

The pressure in the receiver 65 is monitored by a pressure sensor 82, while the safety vent 79 is controlled by connection 83 which in turn connects to a PLC 84 that allows for programmable control of the recovery system 14. The PLC 84 can monitor the pressure sensor 82 and affect an emergency release if necessary.

The leakage gas found in the receiver 65 then is piped to each of the compressor units 68 and 69, which units each comprise a compressor 85, motor 86, control panel 87 controlled by the PLC 84, inlet 88 which receives fluid from the receiver 65, outlet 89 which discharges pressurized fluid to a cooler 90, wherein the pressurized fluid in turn flows into the downstream receiver 66. This receiver 66 includes a respective pressure sensor 91 which connects to the PLC 84 and allows monitoring for suitable pressurization of the leakage fluid.

With these components, the dry gas seal leakage is piped through the lines 58-63 and 71-76 so as to have a controlled setback pressure that can vary from 0.5 to 3 bar pressure depending upon the application. The flow of the seal leakage gases are collected in the accumulator tank 65 wherein the receiver pressure at sensor 82 is fed to the local mounted PLC 84 that will be used to govern the on/off control of the compressors 85 that are used to re-pressurize the recovered dry seal leakage gas to a pressure up to 250 bar depending upon application.

The compressors 85 are standard industry electric motor-driven compressors used for low-flow/high pressure ratio applications. The compression system also includes the coolers 90 that maintain discharge temperatures to meet specific application requirements and are sized per system design. The discharge from the compressors 85 is then collected in the receiver 66 that also acts as a pulsation dampener and also drains off any liquids formed in the gas through the liquid collection line 92 that flows to the drain 80 mentioned above.

Preferably, the compressors 85 are operated as lead/lag compressors wherein typically, only one compressor is required to be operated for most operational pressures and fluid flows. The on/off operation of the compressors 85 is controlled by the PLC 84, although the PLC logic may be modified as desired. Typically, a lead compressor 85 will be operated and if there is a failure of such compressor or if the compressor is not able to handle the leakage flow, the lag compressor may in turn be operated. Normally one compressor 85 would be operated, although there may be an upset condition of the seal which requires operation of both compressors 85. It may even be desirable to alternate operation of the compressors 85 whereby the lead or lag role of the compressor is alternated. For example, a lead compressor may require servicing wherein the second compressor 85 would then be made the lead compressor and the former compressor could be serviced and maintained as a lag compressor for a period of time. Also, two compressors 85 are illustrated but it will be understood that multiple compressors may be provided wherein one compressor is a lead compressor and one or more lag compressors are then provided as lag1 and lag2 compressors.

FIG. 4 includes a listing of the on/off logic for the compressors based upon the pressure sensed at pressure sensors 82 and 91. In this regard, the first compressor 85 could be turned on when the pressure at sensor 82 exceeds 1800 kPag and if the pressure exceeds 1900 kPag, the other lag compressor 85 could then be turned on. Further, the lag and lead compressors may be turned off depending upon the compressor shut-off logic wherein, for example, the lead compressor may be turned off when the pressure at sensor 82 drops below 500 kPag. Further, all operation of the compressors 85 may be shut off in an emergency situation should the sensor 91 detect a pressure which is 1000 kPag greater than the regulated downstream injection pressure described below.

Referring to FIG. 5, the pressurized accumulator 66 has an outlet 96 that discharges to a discharge line 97 that passes through a control valve 98. The control valve 98 is set at 6000 kPag in the particular application illustrated and connects to a pressure sensor 99 that monitors the regulated injection pressure. Hence, emergency shut-off may occur when the pressure at receiver sensor 91 exceeds the pressure at sensor 99 by 1000 kPag or some other emergency pressure differential which would prevent over pressure of the system.

An emergency vent unit 100 is piped in to allow for emergency flare of pressurized gases in an emergency situation.

In non-emergency situations, the injection gas flows through either of two downstream discharge pipes 101 or 102 which connect to the aforementioned piping connection 56 (FIG. 2) or alternatively to a compressor connection 103 provided on the suction side of the compressor unit 16.

Hence, the output of the system can be controlled by the control valve or regulator 98 so as to be at 10 BARG to 250 BARG depending upon the system application. During normal operation, the leakage gas is then re-injected upstream of the dry seal control system supply filters through re-injection line 56 which is located upstream of the filter 54. Alternatively or in combination therewith, re-injection of the gas can be to the suction or discharge sides of the compressor unit 16 through re-injection line 102.

This system is designed for continuous operation and may be readily installed on existing compressor systems with a minimal amount of reconfiguration of the compressor unit 16 or the control panel 12. The lead and lag compressors 85 can be intermittently operated as needed and also can be readily serviced while the system remains online due to the ability to operate the system based solely upon one compressor 85 while the second compressor 85 is taken down for service.

The seal leakage recovery system 14 is made part of the dry seal control system and is capable of re-injecting all greenhouse gas emissions or leakage from the dry gas seals during normal operation. Servicing and maintenance of the compressors 85 can be done by isolating a compressor 85 and continuing operation of the system while the first compressor is serviced. Further, low point drains can be made manual or auto depending upon system needs.

Although a particular preferred embodiment of the invention have been disclosed in detail for illustrative purposes, it will be recognized that variations or modifications of the disclosed apparatus, including the rearrangement of parts, lie within the scope of the present invention.

What is claimed is:

1. A seal leakage recovery system for recovering leakage from at least one unit of rotating equipment having a process fluid chamber, a rotatable shaft and an operator connected to said shaft within said process fluid chamber for operating on a process fluid disposed in said process fluid chamber during rotation of said shaft, said recovery system comprising:

a housing having a central bore receiving said shaft therethrough and having opposite inboard and outboard ends wherein said inboard end is in fluid communication with said process fluid chamber, said housing having seals along said shaft and comprising at least first, second and third chambers disposed along said shaft wherein said third chamber is disposed intermediately between said first and second chambers;

said first chamber receiving a seal supply fluid into said first chamber and receiving fluid leakage of said process fluid along said shaft such that said seal supply fluid includes any said fluid leakage therein, said seal supply fluid being flowable along said shaft from said first chamber to said third chamber;

said second chamber receiving a buffer fluid therein which flows into said second chamber and is flowable along said shaft to said third chamber which mixes with said seal supply fluid within said third chamber to define a leakage recovery fluid;

a flow distribution system which supplies said seal supply fluid to said first chamber, said buffer fluid to said second chamber and receives said leakage recovery fluid from said third chamber, said flow distribution system including a pressurizing device pressurizing said leakage recovery fluid to thereby define said seal supply fluid which flows from said pressurizing device to said first chamber as said seal supply fluid, said seal supply fluid at least comprising said buffer fluid and any of said process fluid leakage collected from said third chamber.

2. The recovery system according to claim 1, wherein said pressurizing device is a compressor.

3. The recovery system according to claim 2, wherein said flow distribution system comprises a plurality of said compressors in a lead-lag configuration wherein at least one of said compressors is operable to pressurize said leakage recovery fluid for return to said first chamber as said seal supply fluid.

4. The recovery system according to claim 3, wherein said flow distribution system comprises an accumulator which receives said leakage recovery fluid and supplies said leakage recovery fluid to said compressor.

5. The recovery system according to claim 4, wherein said accumulator receives said leakage recovery fluid from a plurality of said rotating equipment units and said pressurizing device supplies a plurality of said rotating equipment units with said seal supply fluid.

6. The recovery system according to claim 4, wherein said accumulator receives said leakage recovery fluid from a plurality of said rotating equipment units and said compressor supplies a plurality of said rotating equipment units with said seal supply fluid.

7. The recovery system according to claim 1, wherein said buffer fluid is an inert gas.

8. The recovery system according to claim 1, wherein said first chamber is disposed on an inboard side of said third chamber adjacent said process fluid chamber, and said second chamber is disposed on an outboard side of said third chamber.

9. The recovery system according to claim 8, wherein said second chamber has an inboard end and an outboard end, wherein a separation fluid is supplied to said outboard end wherein portions of said separation fluid can flow into said second chamber and outwardly to an environment.

10. The recovery system according to claim 1, wherein said flow distribution system comprises fluid treatment units which includes filters for processing said leakage recovery fluid prior to supply to said first chamber as said seal supply fluid.

11. The recovery system according to claim 1, wherein said housing defines a fourth chamber disposed on an outboard side of said second chamber wherein said fourth chamber receives any said buffer fluid flowing along said shaft from said second chamber to said fourth chamber wherein said buffer fluid in said fourth chamber is vented to an exterior of said recovery system.

12. The recovery system according to claim 1, wherein said seal supply gas is pressurized to a supply pressure that is greater than a process fluid pressure of said process fluid within said process fluid chamber.

13. A method for recovering seal leakage from at least one unit of rotating equipment having a process fluid chamber, a shaft extending into said process fluid chamber, and an operator connected to said shaft within said process fluid chamber for operating on a process fluid disposed in said process fluid chamber during rotation of said shaft, the method comprising the steps of:
providing a seal leakage recovery system comprising a housing having a central bore receiving said shaft therethrough and having opposite inboard and outboard ends wherein said inboard end is in fluid communication with said process fluid chamber, said housing comprising at least first, second and third chambers disposed along said shaft wherein said third chamber is disposed intermediately between said first and second chambers and is separated therefrom by respective first and second shaft seals;
supplying a seal supply fluid into said first chamber, said first chamber receiving fluid leakage of said process fluid along said shafts such that said seal supply fluid includes any said seal leakage therein, said seal supply fluid being flowable along said shaft from said first chamber to said third chamber;
supplying a buffer fluid into said second chamber which flows into said second chamber and is flowable along said shaft to said third chamber which mixes with said seal supply fluid within said third chamber to define a leakage recovery fluid;
recovering said leakage recovery fluid from said third chamber which flows through a flow distribution system;
pressurizing said leakage recovery fluid recovered from said third chamber which thereby defines said seal supply fluid and flows from said pressurizing device to said first chamber as said seal supply fluid, said seal supply fluid at least comprising said buffer fluid and any of said process fluid leakage.

14. The method according to claim 13, wherein said pressurizing device is a compressor, the method includes the step of operating said to pressurize said leakage recovery fluid for return as said seal supply fluid to said first chamber.

15. The method according to claim 13, wherein said seal supply gas is pressurized to a supply pressure that is greater than a process fluid pressure of said process fluid within said process fluid chamber.

16. The method according to claim 13, comprising the steps of receiving said leakage recovery fluid in an accumulator prior to said pressurizing device and supplying said leakage recovery fluid from said accumulator to said pressurizing unit.

17. The method according to claim 16, wherein said accumulator receives said leakage recovery fluid from a plurality of said rotating equipment units and said pressurizing unit supplies a plurality of said rotating equipment units with said seal supply fluid.

18. The method according to claim 13, wherein said first chamber is disposed on an inboard side of said third chamber adjacent said process fluid chamber, and said second chamber is disposed on an outboard side of said third chamber.

* * * * *